Patented July 24, 1934

1,967,232

UNITED STATES PATENT OFFICE 1,967,232

RESINOUS AND BALSAMIC COMPLEXES

Carleton Ellis, Montclair, N. J., assignor to Ellis-Foster Company, a corporation of New Jersey No Drawing. Application March 10, 1930, Serial No. 434,812

5 Claims. (Cl. 260—8)

This invention relates to resinous and balsamic complexes and relates in particular to resins and balsams of the glyceride type intermingled or compounded with phenolic resins, preferably of a xylenitic character, and further relates to resins preferably of a soluble character adapted to be used in the dissolved state in appropriate solvents in conjunction with nitrocellulose, and the like, as coating compositions. This application is a continuation in part of the following copending applications.

In Serial No. 171,380, I have referred to the employment of mixed resins, such as rosin phthalic glyceride resin and phenol aldehyde resin, with nitrocellulose (which may be of low viscosity) all dissolved in a suitable solvent medium. Various plasticizers, softening agents, pigments, fillers, and so forth, may be present.

Serial No. 242,530 refers in a somewhat similar way to the employment conjointly of phthalic glyceride resins and phenol formaldehyde resins, including their various modifications such as rosin phenol formaldehyde resin. In this application cottonseed phthalic glyceride resin has particular mention and it is proposed to use mixtures of resins of this general type with the phenolic resin in a manner similar to that in the case of the rosin phthalic glyceride resins.

Xylenitic resins made by reaction with formaldehyde or other aldehydes in the presence of a basic catalyst have been described in my copending application Serial No. 751,867.

The employment of nitrocellulose of low viscosity, for example half second viscosity, has been especially recommended in other copending applications, including Serial No. 94,596 (page 26). In the last mentioned application I have referred to the peculiar solubility characteristics obtainable with low viscosity nitrocellulose, enabling the employment of a wider range of synthetic resins, including phenol formaldehyde or other phenol aldehyde resins of scant utility or compatibility with the older types of soluble cotton of high viscosity and easy coagulability. Various formaldehyde resin products such, for example, as may be obtained from formaldehyde and cyclohexanone, substituted phenols, and the like, may be used. As stated in Serial No. 94,596, some of the simple phenol formaldehyde resins are liable to give brittle films. Furthermore, it is stated that resins which are not properly compatible and/or lack the power of adequately "colloiding" with low viscosity nitrocellulose, may be used in some cases in conjunction with a synthetic resin or analogous synthetic solid having the desired property in notable degree.

The following examples will serve to illustrate typical and desirable resinous complexes within the scope of the present invention and further, by the way of more specific illustration, I shall provide an example of a resin which is not adequately compatible with nitrocellulose but which may be used for other purposes more advantageously.

In the following examples the parts stated are proportions by weight.

*Example 1 (Laboratory Record 7413)*

| | Parts |
|---|---|
| Crude xylenol | 37.5 |
| Formalin (containing about 37.5 per cent formaldehyde) | 51 |
| 10% aqueous sodium hydroxide solution | 1.5 |

This batch was heated to a boiling temperature for about 20 minutes, under a reflux condenser, when separation into two layers resulted. The crude or incipient resin so formed is then ready to be intermingled or compounded with the phthalic glyceride component. For this purpose the entire batch may be taken, including the aqueous liquid which has separated, or, if desired, the latter may be decanted and used in the treatment of additional xylenol material since an excess of formaldehyde has been employed. The formaldehyde, of course, may be recovered in other ways, if desired. Whether or not the aqueous layer is separated, the reaction mixture as above is incorporated with 200 parts rosin, 38.4 parts phthalic anhydride and 44.2 parts glycerol. The batch is heated slowly to 280° C. and is held at that point for ¾ of an hour. The resin obtained is blown with steam while it is being heated at 230-240° C., the steam treatment taking about 1 hour. From calculation of the raw materials used, this resin may be regarded as containing roughly 59-60 per cent rosin, mainly in combined form, with equal proportions of the two other resinous components, namely the xylenitic component and the phthalic glycerol component.

After such steam treatment a light hard resin results having a softening point of 128° C. (the softening point before steaming was 119° C.). The loss in weight by the steam treatment in the example given above was 7.6 per cent.

*Example 2 (Laboratory Record 7413)*

Approximately the same procedure was employed as in Example 1, but the phthalic glyceride component was employed in the ratio of 3 parts to 1 part of the xylenol aldehyde component, the percentage of substantially combined rosin remaining the same, namely, at approximately 59-60 per cent.

Before steaming the softening point was 104° and after steaming 110° C.

*Example 3 (Laboratory Record 7401)*

| | Parts |
|---|---|
| Crude xylenol | 30.5 |
| Formalin | 42 |
| 10% sodium hydroxide solution | 1.25 |

After resinification to a crude soft resin, a mixture was made by incorporating the batch with 267 parts rosin, 10 parts phthalic anhydride and 30 parts glycerol. Reaction was carried out at 280-290° C. and the well resinified product was not steamed. Its softening point was 110° C.

This resin was so proportioned that based on calculations of raw materials used there was present approximately 75 per cent rosin (substantially in combined form), 13 per cent xylenol formaldehyde resin and 5 per cent phthalic glyceride resin. These results are not given as accurate and are only approximations set forth for the purpose of rough comparison. This resin is submitted as an example because of the fact that at about this point of phthalic content the limit of nitrocellulose compatibility apparently is reached. Films obtained with this resin and half second nitrocellulose showed turbidity.

*Example 4 (Laboratory Record 7401)*

| | Parts |
|---|---|
| Xylenols | 61 |
| Formalin | 83 |
| Sodium hydroxide solution | 2.5 |

This is heated and reacted to bring about incipient resinification and then incorporated with 267 parts rosin, 30 parts glycerol and 10 parts phthalic anhydride.

The treatment otherwise is carried out as given in Example 3, yielding a softening point of 134° and an acid number of 28. On steaming the softening point increased to 147° C., constituting a 13° rise. This is a very hard resin but is not suitable for use with nitrocellulose. It gives very turbid films.

In this resin the composition, expressed very roughly on the basis of the raw materials used, may be calculated at rosin 67 per cent, xylenol resin 23 per cent and phthalic glyceride resin 5 per cent, some glycerol being combined with rosin.

*Example 5 (Laboratory Record 7427)*

| | Parts |
|---|---|
| Xylenols | 55.3 |
| Formalin | 75 |
| Sodium hydroxide solution | 2.2 |

After reaction as above the batch is incorporated with 200 parts rosin, 56.5 parts phthalic anhydride and 52.6 parts glycerol. Heating at 280-290° C. for ¾ of an hour and then steaming at 230-240° C. for 1 hour yields an excellent resin with a softening point of 142° C.

Considering the composition of this resin on the basis of the raw materials used, there is approximately 51 per cent rosin substantially in combined form, with equal parts of the xylenol formaldehyde resin and the phthalic glycerol resin.

*Example 6 (Laboratory Record 7428)*

| | Parts |
|---|---|
| Xylenols | 61 |
| Formalin | 83 |
| Sodium hydroxide solution | 2.5 |

This mixture is heated to boiling for ½ hour, cooled, and the aqueous layer decanted, then heated at 70° C. to clarify.

| | Parts |
|---|---|
| Rosin | 148 |
| Phthalic anhydride | 63.1 |
| Glycerol | 48.4 |

The xylenitic resin was incorporated with the three last mentioned materials and heating carried on for ¾ of an hour at 280-290° C., followed by steaming for 1 hour at 250-260° C. A resin of remarkably high melting point was obtained. The softening point registered 155-160° C.

In like manner the rough composition for comparison with the products of Examples 4 and 5 may be taken as 42 per cent rosin with equal parts of the xylenitic and phthalic resin components. Except as indicated in the foregoing the various resins illustrated were readily compatible with low viscosity nitrocellulose. Solutions were prepared using

| | Parts |
|---|---|
| Half second nitrocellulose | 5 |
| Resin | 20 |
| Butyl alcohol | 10 |
| Butyl acetate | 20 |
| Toluol | 30 |

Hard brilliant films were obtained. Those secured using the resins of Examples 5 and 6 were of a desirable degree of hardness.

It is one object of the present invention, insofar as the lacquer phase thereof is concerned, to produce resins which have good sanding qualities, that is, will rub down in the coatings in which they are found without gumming the abrasive paper used. Such free sanding resins are to be found especially in the harder types of the soluble resins described herein. Used in various proportions with nitrocellulose a free sanding surface of the dried coating results.

While I have attempted in the foregoing to indicate ratios between the several components of the resins of the present invention, I have done this merely for comparative purposes and do not wish thereby to intimate that I consider the composition of the resin indicated by such comparisons. Inter-reaction or inter-resinification may take place in greater or less degree with resulting equilibrium to form a complex whose constitution would be difficult to ascertain. Therefore I content myself with calling attention to this fact and do not wish to be limited to any interpretation of composition.

While I have particularly mentioned phthalic anhydride as an organic acid component, I do not wish to be limited thereto, but may use succinic, malic, benzoic, diphenic, naphthenic, and numerous other acids as set forth in my various copending applications and also may employ, in part at least, higher fatty acids such as those derived from animal and vegetable fats and oils, including cottonseed, corn, soya bean, castor, linseed, tung, and the like, or mixtures of these. Likewise with respect to glycerol, which has been employed illustratively herein, I may, if desired, employ polyglycerols or glycerol ethers, various glycols, such as ethylene glycol and glycol ethers such as diethylene glycol, and the like. The employment of mannitol, pentaerythritol, and similar or analogous polyhydroxy alcohols is not precluded insofar as resinification may be secured therewith to yield the complex products of the present invention adapted for the purpose specified. In place of rosin I may use other natural resins, such as run Congo resin and other hard or soft resinous products having free resin acid capable of combining with glycerol or glycol.

The phenolic resin preferably is of the xylenitic type. I have observed that xylenol resins are relatively light-stable, that is, do not discolor under the action of light as some of the phenol aldehyde resins have been observed to do. Since light-stability is important in coating compositions, I preferably employ the xylenitic material in the preparation of these resins. The crude xylenols may be conveniently obtained in the form of higher tar acids which frequently contain some cresylic acid on the one hand and hydroxy bodies higher than xylenols on the other hand. In fact, I have employed a xylenol fraction the boiling point of which would indicate a substantial component of higher homologues of xylenol, and the like. However, I do not wish to be limited to the xylenitic resins, but may, if desired, utilize resins made from cresylic acid or even from phenol. The resins of the latter type, for example, may be employed in pigmented or dark colored compositions where color stability may not be an important consideration. While I prefer to employ formaldehyde, I do not wish to be limited to such aldehyde and may use acetaldehyde and other aldehydes forming resins within the field of the present invention as desired. Mixtures of aldehydes may be employed for example on mixtures of phenolic bodies.

From the foregoing, therefore, it will be seen that there can be produced many modifications of the resins involved herein. I aim, however, particularly to secure complex or mixed resins of relatively high melting point. For instance, rosin phthalic glyceride made in the proportions ordinarily employed in the lacquer trade at the present time has a softening point of, say, 90° C. By treatment as aforesaid with xylenol resin in minor proportion soluble, high melting point products are obtained giving sanding characteristics of a desirable character. Preferably, therefore, I employ, for example, a rosin phthalic glyceride component as a major constituent and a phenol aldehyde component as a minor or hardening constituent, varying the proportion of the latter with respect to the melting or softening point desired.

In some cases, however, the phenolic aldehyde component may become the major constituent, especially when nitrocellulose of low viscosity is used. Thus I propose, when employing nitrocellulose of approximately one-half second viscosity, in some instances to increase the phenolic aldehyde component in large measure, all depending on the hardness, toughness and other characteristics desired. In other words, from the coating composition standpoint I may employ a phenolic resin complex, in a dissolved state, with low viscosity nitrocellulose, preferably with nitrocellulose of approximately one-half second viscosity or even lower viscosity; such complex preferably being of a xylenitic character and being in compatible relationship with the nitrocellulose. In other words, the phenolic resin complex, whatever its constitution and irrespective of the presence or absence of the glyceride resin component, in its final form should be compatible with the low viscosity nitrocellulose when employed therewith in coating compositions, and the like.

While I prefer to employ basic catalysts in preparing the phenolic resin complex, I do not wish to be limited thereto, but may use acid catalysts if desired or react without catalyst, under pressure if need be, in order to obtain the complex in the desired state. I have already indicated that I prefer to use crude xylenols, but likewise do not wish to be limited to the crude form, since I may use pure xylenol distillates if desired; also various other phenolic bodies or analogous reactive hydroxylated compounds. A coal tar acid distillate suitable for use in making a phenolic resin complex possesses the following boiling point range:

| | Per cent |
|---|---|
| Below 210° | 7 |
| Below 215 | 53.2 |
| Below 220 | 86.2 |
| Below 225 | 94.5 |
| Below 230 | 97.0 |
| Below 235 | 98.0 |

What I claim is:

1. A phenolic aldehyde rosin phthalic glyceride condensation product.

2. A xylenol aldehyde rosin phthalic glyceride condensation product.

3. A xylenol formaldehyde rosin phthalic glyceride condensation product.

4. A xylenol formaldehyde rosin polybasic organic acid glyceride condensation product.

5. A phenolic aldehyde monobasic-resin-acid polybasic organic acid polyhydric-alcohol condensation product.

CARLETON ELLIS.